US011231483B2

(12) United States Patent
Kashiwagi et al.

(10) Patent No.: US 11,231,483 B2
(45) Date of Patent: Jan. 25, 2022

(54) RADAR APPARATUS AND AUTOMOBILE INCLUDING THE SAME

(71) Applicant: Murata Manufacturing Co., Ltd., Kyoto (JP)

(72) Inventors: Katsuhisa Kashiwagi, Kyoto (JP); Atsuyuki Yuasa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/808,640

(22) Filed: Mar. 4, 2020

(65) Prior Publication Data

US 2020/0217924 A1 Jul. 9, 2020

Related U.S. Application Data

(63) Continuation of application No. PCT/JP2018/031254, filed on Aug. 23, 2018.

(30) Foreign Application Priority Data

Sep. 5, 2017 (JP) .............................. JP2017-170689

(51) Int. Cl.
*G01S 7/35* (2006.01)
*G01S 13/58* (2006.01)
*G01S 13/931* (2020.01)

(52) U.S. Cl.
CPC .............. *G01S 7/35* (2013.01); *G01S 13/586* (2013.01); *G01S 13/931* (2013.01)

(58) Field of Classification Search
CPC ........ G01S 7/35; G01S 13/586; G01S 13/931; G01S 13/34; G01S 13/42; H01Q 3/22; H01Q 21/06

(Continued)

(56) References Cited

U.S. PATENT DOCUMENTS 5,396,256 A * 3/1995 Chiba .................. H01Q 3/2605
342/157
6,121,917 A * 9/2000 Yamada ................ G01S 13/345
342/104

(Continued)

FOREIGN PATENT DOCUMENTS

JP          S62-4667 B2     1/1987
JP          H01-36077 B2    7/1989
(Continued)

OTHER PUBLICATIONS

Notice of Reasons for Rejection for JP Patent Application No. 2019-540876 dated Mar. 16, 2021.
(Continued)

*Primary Examiner* — Vladimir Magloire
*Assistant Examiner* — Alexander L. Syrkin
(74) *Attorney, Agent, or Firm* — Pearne & Gordon LLP

(57) ABSTRACT

A radar apparatus and an automobile including the radar apparatus are provided. The radar apparatus may measure the elevation/declination angle of a target with high accuracy by using simple circuits at low cost without use of a detection circuit and an AD conversion circuit having high time resolution. A transmit antenna transmits transmit signal waves modulated through the multilevel FSK, and receive antennas receive reflected waves obtained by reflecting, off a target, the transmit signal waves which return. The multilevel FSK is used as a modulation method so that the beat frequency between the receive signal waves from the target and the transmit signal waves serves as the Doppler frequency. Thus, the elevation/declination angle φ of the target is calculated by a computing unit, not from the frequencies of the receive signal waves as in the related art, but from the frequency of the transmit signal waves.

5 Claims, 7 Drawing Sheets

(58) Field of Classification Search
USPC ...................................................... 342/25, 28
See application file for complete search history.

(56) References Cited

U.S. PATENT DOCUMENTS

| | | | | |
|---|---|---|---|---|
| 8,390,507 | B2* | 3/2013 | Wintermantel | H01Q 9/0407 |
| | | | | 342/70 |
| 8,994,586 | B1* | 3/2015 | Choi | G01S 13/584 |
| | | | | 342/200 |
| 10,031,211 | B2* | 7/2018 | Ookawa | G01S 13/34 |
| 10,809,370 | B2* | 10/2020 | Kim | G08G 5/0082 |
| 2004/0125009 | A1* | 7/2004 | Nishiguchi | G01S 3/20 |
| | | | | 342/28 |
| 2004/0125012 | A1* | 7/2004 | Okamura | H01Q 21/0006 |
| | | | | 342/81 |
| 2005/0128127 | A1* | 6/2005 | Tevs | G01S 7/03 |
| | | | | 342/28 |
| 2005/0242983 | A1* | 11/2005 | Fullerton | G01S 7/2926 |
| | | | | 342/22 |
| 2012/0169525 | A1 | 7/2012 | Klar et al. | |
| 2016/0311388 | A1 | 10/2016 | Diewald | |
| 2018/0031695 | A1* | 2/2018 | Carswell | G01S 13/93 |
| 2018/0149737 | A1* | 5/2018 | Kim | G01S 13/426 |
| 2018/0159647 | A1* | 6/2018 | Nayyar | G01S 13/87 |

FOREIGN PATENT DOCUMENTS

| | | |
|---|---|---|
| JP | 2009-192359 A | 8/2009 |
| JP | 2012-098107 A | 5/2012 |
| JP | 2012-512387 A | 5/2012 |
| JP | 2012-108075 A | 6/2012 |
| JP | 2015-190777 A | 11/2015 |
| JP | 2015190777 A * | 11/2015 |

OTHER PUBLICATIONS

International Search Report Issued in Patent Application No. PCT/JP2018/031254 dated Oct. 23, 2018.

Written Opinion Issued in Patent Application No. PCT/JP2018/031254 dated Oct. 23, 2018.

* cited by examiner

RADAR APPARATUS AND AUTOMOBILE INCLUDING THE SAME

This is a continuation of International Application No. PCT/JP2018/031254 filed on Aug. 23, 2018 which claims priority from Japanese Patent Application No. 2017-170689 filed on Sep. 5, 2017. The contents of these applications are incorporated herein by reference in their entireties.

BACKGROUND

Technical Field

The present disclosure relates to a radar apparatus having the function of calculating the elevation/declination angle of a target, and an automobile including the radar apparatus.

In the related art, a radar apparatus of this type is, for example, a radar apparatus for ships which is disclosed in Patent Document 1. This radar apparatus transmits a transmit beam from an antenna. Thus, a transmit signal is transmitted to the antenna through an elevation/declination-angle-direction scan unit including a phase shifter. The antenna is formed by stacking a large number of antenna devices on top of one another in the height direction, and rotates around the rotation shaft. The transmit signal, which is a chirp, is subjected to linear frequency modulation. In one pulse of the transmit beam, the radiation direction of the main beam is directed to the most downward angle of declination in the initial pulse phase having a low frequency. As the frequency of the transmit signal increases, the radiation direction changes upward. In the final pulse phase having the highest frequency, the radiation direction is directed to the most upward angle of elevation. The receive signal components of the reflection echo received by the antenna pass through the elevation/declination-angle-direction scan unit, and components, for which the angle of the elevation/declination angle direction of the receive beam matches the angle of the transmit beam, are transmitted to a receiving unit.

The receiving unit uses an analysis method such as the Fourier transform to detect frequency components of a receive signal at each time. Among the detected frequency components of the receive signal, the reflection echo for the corresponding frequency components of the transmit signal is found. The elevation/declination angle, at which the main beam of the transmit beam is directed, is obtained. In addition, the distance, in which electromagnetic waves of the transmit beam make a round trip, is obtained from the reception time. Even if, as in the radar apparatus for ships disclosed in Patent Document 1, a radar apparatus which measures the distance to a target such as a ship at a long distance has a coarse distance resolution, this does not cause a problem because of consideration of the size of the target. Thus, the chirp period may be made long. Accordingly, measurement of the time difference in conformity with the distance may be achieved by using a simple circuit configuration. In addition, an increase in power per elevation angle direction period increases the receiver sensitivity.

In the related art, a radar apparatus is disclosed in Patent Document 2. The radar apparatus has the configuration in which all of the transmit antennas Tx1 and Tx2 and the receive antennas Rx1, Rx2, Rx3, and Rx4 are disposed in such a manner that the longitudinal direction of the openings is directed in the vertical direction. The two receive antennas Rx1 and Rx2 are disposed in the horizontal direction so as to be spaced apart with a device interval of Lh. The two transmit antennas Tx1 and Tx2 are disposed in the horizontal direction with the two receive antennas Rx1 and Rx2 interposed in between. The two receive antennas Rx3 and Rx4 are disposed in the vertical direction so as to be spaced apart with a device interval of Lv, and are disposed adjacent to the transmit antenna Tx2 in the horizontal direction. The azimuth angle of a target is obtained from the phase difference between the two receive antennas Rx1 and Rx2 disposed in the horizontal direction. The elevation/declination angle of the target is obtained from the phase difference between the two receive antennas Rx3 and Rx4 disposed in the vertical direction.

Patent Document 1: Japanese Unexamined Patent Application Publication No. 2012-108075
Patent Document 2: Japanese Unexamined Patent Application Publication No. 2012-98107

BRIEF SUMMARY

Compared with, as in the radar apparatus disclosed in Patent Document 1, a radar apparatus which measures the distance to a target such as a ship at a long distance, a radar apparatus such as a car-mounted radar which detects a small target at a relatively short distance needs a higher distance resolution and a receiver system having a higher time resolution, than a radar apparatus for a target such as a ship at a long distance. As a result, the chirp period of the transmit signal is made short, and the detection sensitivity for a target degrades compared with the case in which the transmit signal is transmitted by using continuous waves such as frequency shift keying (FSK) waves. In addition, the distance to a target is short. Thus, detection of the time differences between transmit signal waves and reflected waves needs a detection circuit having a high time resolution. For example, the time difference Δt in the case of a distance R of 6 [m] to a target is obtained as follows: Δt=2 R/c=40 [nsec] where the speed of light is represented by c. Measurement of the time differences with high accuracy needs an apparatus including a detection circuit and an AD (analog-digital) conversion circuit having a high sampling frequency. In addition, antennas are disposed in the elevation angle direction, and a receive system (LNA, MIXER, IFAMP, FILTER) is added, resulting in a problem of a complicated circuit and high cost.

The present disclosure provides a radar apparatus and an automobile including the radar apparatus. The radar apparatus may measure the elevation/declination angle of a target with high accuracy at low cost by using a simple circuit without necessarily use of a detection circuit and an AD conversion circuit having high time resolution.

Accordingly, the present disclosure provides a radar apparatus including a signal generator, an array antenna, a mixer, and a computing unit. The signal generator generates a transmit signal subjected to shift keying to multiple frequencies. The array antenna transmits a transmit signal wave whose beam is inclined by an elevation/declination angle corresponding to a frequency of the transmit signal generated by the signal generator, and receives, as a receive signal wave, a reflected wave obtained by reflecting, off a target, the transmitted transmit signal wave which returns. The mixer converts the frequencies of the transmit signal wave and the receive signal wave into intermediate frequencies. The computing unit computes the elevation/declination angle of the target from the frequencies of the transmit signal wave, and obtains a multiplied signal between the transmit signal wave and the receive signal wave, whose frequencies are converted into intermediate frequencies, for each of the multiple frequencies obtained through shift keying, calculates a distance to the target from a phase difference between the obtained multiplied signals, and calculates a relative velocity with respect to the target from the frequencies of the obtained multiplied signals.

According to the configuration, a transmit signal having been subjected to shift keying to multiple frequencies is transmitted from an array antenna, and the array antenna receives, as receive signal waves, reflected waves obtained by reflecting, off a target, the transmit signal waves which return. Thus, the elevation/declination angle of the target is calculated by the computing unit, not from the frequencies of the receive signal waves as in the related art, but from the frequencies of the transmit signal waves. In addition, a transmit signal which has been subjected to shift keying to multiple frequencies is transmitted from the array antenna, and the elevation/declination angle of the target is calculated on the basis of a known multilevel transmit frequency. Thus, even in the case of a short distance to a target, the elevation/declination angle of the target may be measured with high accuracy at low cost by using a simple circuit without necessarily use of a detection circuit and an AD conversion circuit having high time resolution.

According to the configuration, a multiplied signal between a transmit signal wave and a receive signal wave which are converted into intermediate frequencies is obtained for each of the multiple frequencies obtained through shift keying. Thus, in addition to the elevation/declination angle of a target, the distance to the target and the relative velocity with respect to the target may be measured with high accuracy at low cost by using a simple circuit.

The present disclosure provides an automobile including the radar apparatus described above.

The present disclosure may provide a radar apparatus and an automobile including the radar apparatus. Even in the case of a short distance to a target, the radar apparatus may measure the elevation/declination angle of the target with high accuracy at low cost by using a simple circuit without necessarily use of a detection circuit and an AD conversion circuit having high time resolution.

DETAILED DESCRIPTION

An embodiment for a radar apparatus of the present disclosure will be described.

Figure 1A:
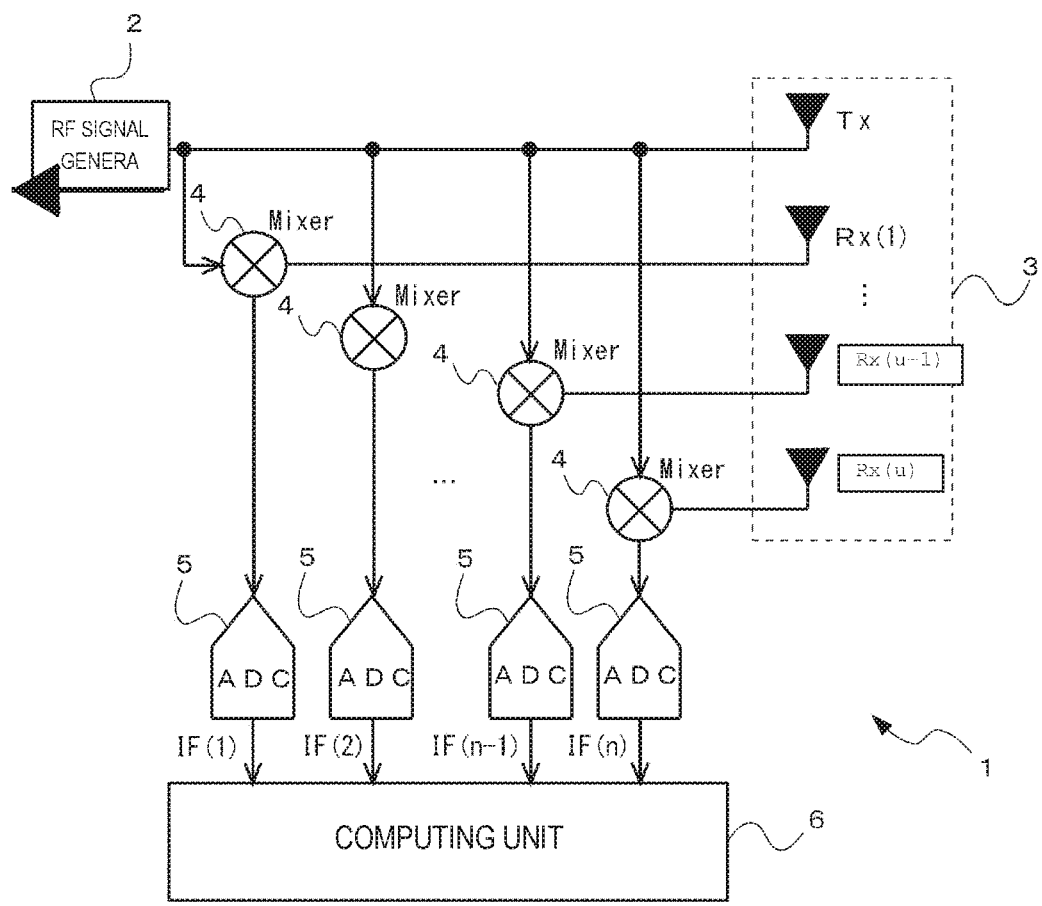
FIG. 1A is a schematic diagram illustrating the configuration of a radar apparatus according to an embodiment of the present disclosure.

FIG. 1A is a schematic diagram illustrating the configuration of a radar apparatus 1 according to an embodiment of the present disclosure.

The radar apparatus 1 includes an RF (Radio Frequency) signal generator 2, an array antenna 3, mixers 4, ADCs (Analog to Digital Converters: analog/digital converters) 5, and a computing unit 6 (e.g., a processor). The RF signal generator 2 is a signal generator that is capable of changing a signal frequency with time, and generates a transmit signal obtained through shift keying to multiple frequencies, that is, modulation using multilevel FSK (Frequency Shift Keying). The array antenna 3 includes a transmit antenna Tx and receive antennas Rx(1), . . . , Rx(u−1), Rx(u). The transmit antenna Tx transmits transmit signal waves whose beams are inclined by the elevation/declination angle corresponding to the frequency of the transmit signal generated by the RF signal generator 2. The receive antennas Rx(1), . . . , Rx(u−1), Rx(u) receive, as receive signal waves, reflected waves obtained by reflecting, off a target, the transmit signal waves which return. The transmit signal waves are transmitted from the transmit antenna Tx. The mixers 4 convert the frequencies of the transmit signal waves and the receive signal waves into intermediate frequencies IF (Intermediate Frequency). The ADCs 5 convert input analog signals into digital signals for output. As described below, the computing unit 6 calculates the elevation/declination angle of a target, the azimuth angle of the target, the distance to the target, and the relative velocity with respect to the target on the basis of the transmit signal waves and the receive signal waves.

Figure 1B:
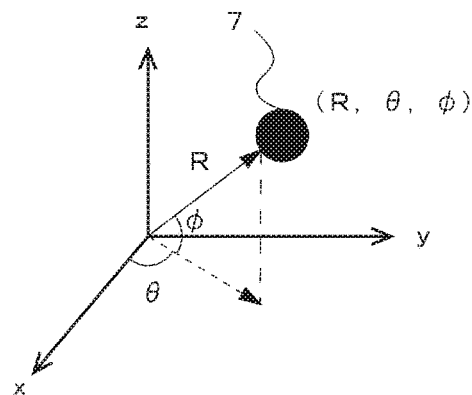
FIG. 1B illustrates the coordinates of a target.

FIG. 1B illustrates the coordinates in which the elevation/declination angle φ of a target 7, the azimuth angle θ of the target, and the distance R to the target 7 are illustrated. The elevation/declination angle φ of the target 7 is an angle in the z-axis direction between the target vector, which is indicated by using the solid-line arrow, and the xy plane. An angle which ascends from the xy plane is an angle of elevation, and an angle which descends from the xy plane is an angle of declination. The azimuth angle θ is an angle between the projected vector, which is indicated by using a dotted line and which is obtained by projecting the target vector onto the xy plane, and the x axis. The distance R to the target 7 is a distance from the center of the radar, which is located at the origin of the coordinates, to the target 7.

Figure 2:
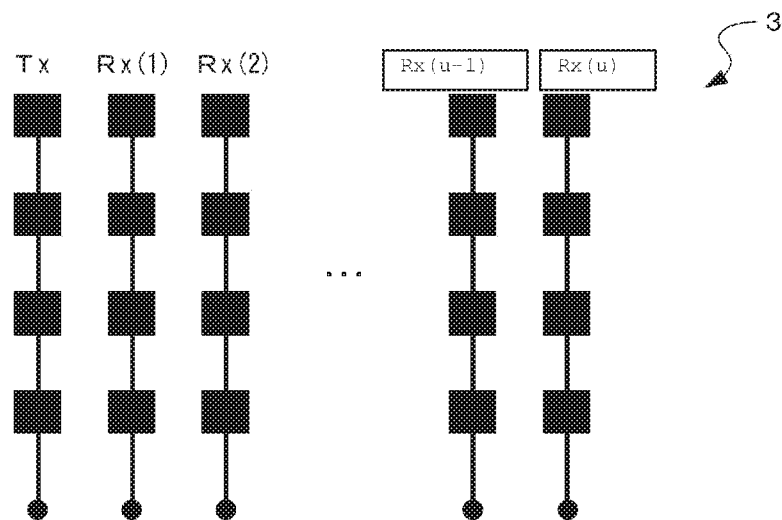
FIG. 2 is a plan view of an array antenna included in a radar apparatus according to an embodiment.

FIG. 2 is a plan view of the configuration of the array antenna 3. The array antenna 3 is formed on an identical plane. Each of the single transmit antenna Tx and the receive antennas Rx(1), . . . , Rx(u−1), Rx(u), whose number is u, forms a unit antenna 3(i) illustrated in FIG. 3A, and includes four patch antenna devices p1, p2, p3, and p4, which are arranged linearly, and a single antenna power supply point Q.

The transmit antenna Tx has the patch antenna devices p1, p2, p3, and p4 which are arranged linearly in the column direction and which are supplied with a signal frequency, whose phase is made different among the patch antenna devices, from the antenna power supply point Q. Thus, the transmit antenna Tx transmits radio waves in the elevation/declination angle direction. In addition, the receive antennas Rx(1), . . . , Rx(u−1), Rx(u) are arranged side by side in the row direction. Thus, the azimuth angle θ of the target 7 is calculated as described below from the phase difference in signal waves received by the receive antennas Rx(1), . . . , Rx(u−1), Rx(u) which are adjacent to each other. Further, the elevation/declination angle φ of the target 7 is calculated as described below from the known frequencies of a transmit signal supplied to the transmit antenna Tx.

The patch antenna devices p1, p2, p3, and p4, which form the unit antenna 3(i), are formed on a substrate (not illustrated) so as to be spaced apart with intervals of d. The phase $\eta_1$ ($0 \leq \eta_1 \leq \pi$) of a signal wave transmitted from a corresponding one of the patch antenna devices p1, p2, p3, and p4 is expressed by using Expression (1) described below where the wavelength of the signal wave in the substrate is represented by λ(f), and the antenna number is represented by m.

[Math. 1]

$$\eta_1 = \frac{2\pi d \cdot (m-1)}{\lambda(f)} - 2\pi(m-1) = \frac{2\pi(m-1)(d - \lambda(f))}{\lambda(f)} \quad (1)$$

The antenna number m is defined such that the number of the patch antenna device p1 is 1; the number of the patch antenna device p2 is 2; the number of the patch antenna device p3 is 3; and the number of the patch antenna device p4 is 4. The wavelength λ(f) of a signal wave in the substrate is expressed by using Expression (2) described below with the dielectric constant $\varepsilon_s$ of the substrate, and is shorter than the wavelength $\lambda_0(f)$ in free space.

[Math. 2]

$$\lambda(f) = \frac{\lambda_0(f)}{\varepsilon_s^{1/2}} \quad (2)$$

The phase $\eta_2$ of a signal wave transmitted from a corresponding one of the patch antenna devices p1, p2, p3, and p4 is expressed by using Expression (3) described below with the elevation/declination angle φ at which the transmit signal wave is transmitted.

[Math. 3]

$$\eta_2 = \frac{2\pi d \cdot (m-1)}{\lambda_0(f)} \cdot \sin\varphi \quad (3)$$

Figure 3A:
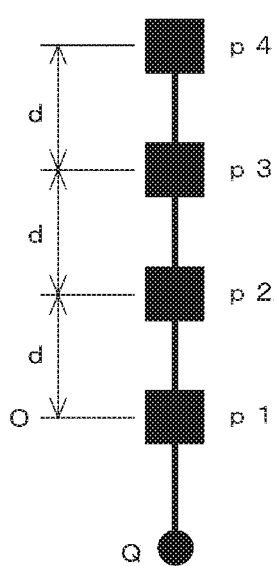
FIG. 3A is a plan view of a unit antenna included in the array antenna illustrated in FIG. 2.
Figure 3B:
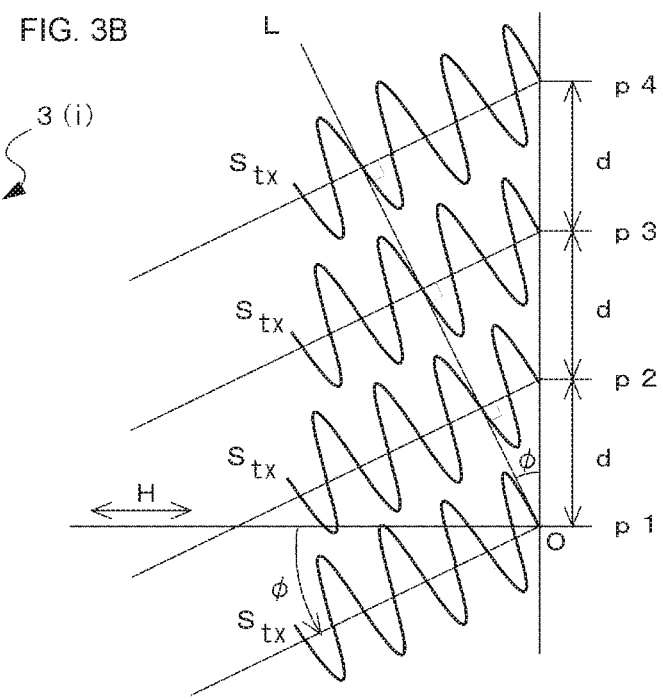
FIG. 3B is a diagram for describing the elevation/declination angle of transmit signal waves transmitted from a transmit antenna.

FIG. 3B is a diagram for describing the elevation/declination angle φ. Each of the patch antenna devices p1, p2, p3, and p4 transmits a corresponding signal wave $S_{tx}$ of the phase $\eta_2$ expressed by using Expression (3). The transmit signal wave $S_{tx}$ is transmitted in the elevation/declination angle direction at the angle φ with respect to the horizontal direction H. As illustrated in FIG. 3A, the phase zero point O of the transmit signal waves $S_{tx}$ is defined at the patch antenna device p1. The straight line L, which connects the phase zero points O of the transmit signal waves $S_{tx}$ to each other, forms the angle φ with respect to the direction in which the patch antenna devices p1, p2, p3, and p4 are arranged, and intersects at right angles in the direction in which the transmit signal waves $S_{tx}$ are transmitted. The phase $\eta_2$ is expressed geometrically by using Expression (3) from sin φ of a right angled triangle whose oblique side has a distance, d·(m−1), among the patch antenna devices p1, p2, p3, and p4.

The phase $\eta_1$ of each of the patch antenna devices p1, p2, p3, and p4 which is expressed by using Expression (1) is to be the same as the phase $\eta_2$ of the corresponding one of the patch antenna devices p1, p2, p3, and p4 which is expressed by using Expression (3). Thus, the transformation described below leads to Expression (4).

[Math. 4]

$$\eta_2 = \eta_1 \quad (4)$$

$$\frac{d \cdot \sin\varphi}{\lambda_0(f)} = \frac{d - \lambda(f)}{\lambda(f)}$$

$$\sin\varphi = \varepsilon_s^{1/2}\left\{1 - \frac{\lambda(f)}{d}\right\} \because \lambda(f) = \frac{\lambda_0(f)}{\varepsilon_s^{1/2}} \therefore$$

$$\varphi(f) = \text{Sin}^{-1}\left[\varepsilon_s^{1/2}\left\{1 - \frac{\lambda(f)}{d}\right\}\right]$$

That is, the elevation/declination angle φ of the transmit signal waves $S_{tx}$ is expressed as a function φ(f) of the frequency f.

Figure 4A:
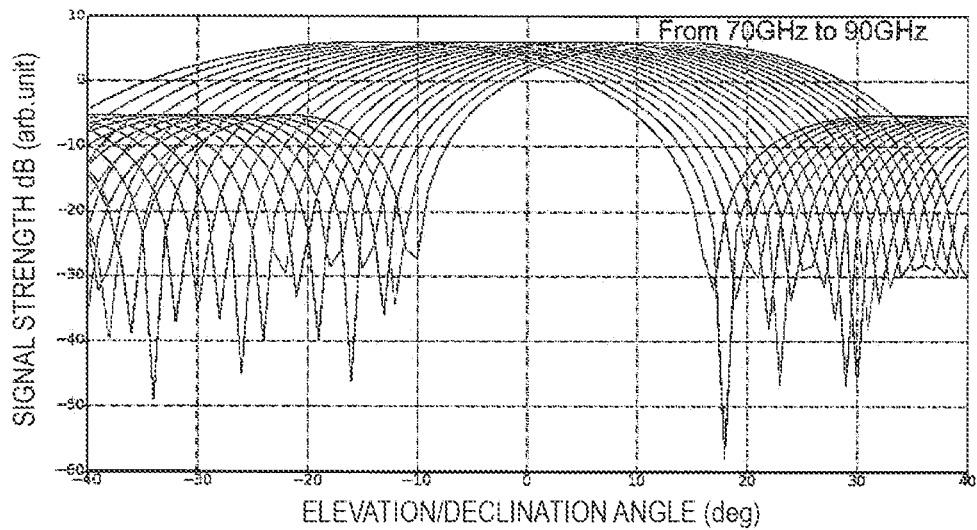
FIG. 4A is a graph illustrating changes in directivity in the elevation/declination angle direction which are obtained when the frequency of the transmit signal waves transmitted from a transmit antenna is changed.
Figure 4B:
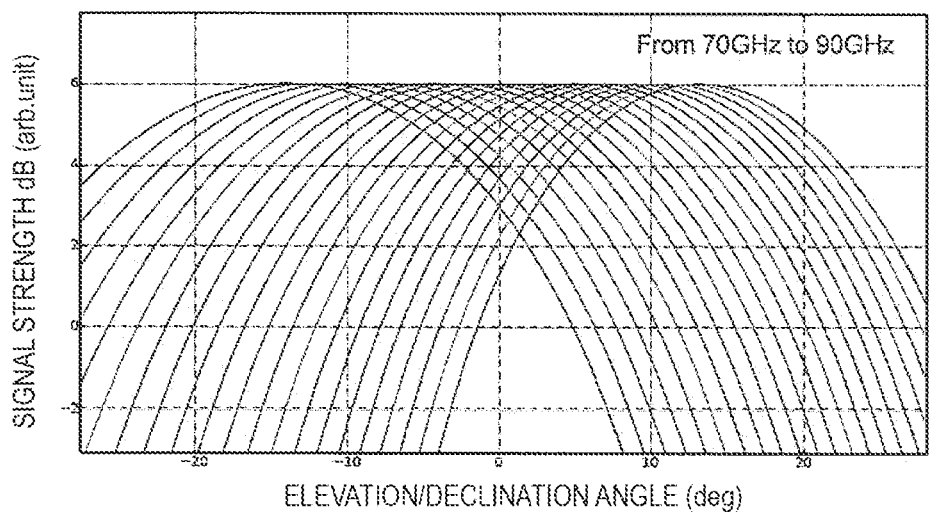
FIG. 4B is a graph illustrating partially enlarged characteristics at and near the peak values of the characteristic lines in the graph illustrated in FIG. 4A.

FIG. 4A is a graph illustrating changes in directivity in the elevation/declination angle direction which are obtained when the frequency f of the transmit signal waves $S_{tx}$ transmitted from the transmit antenna Tx is changed. The horizontal axis of the graph represents the elevation/declination angle φ (deg), and the vertical axis represents signal strength dB (arb.unit). The 21 characteristic lines indicate changes in directivity of the transmit antenna Tx which are obtained when the frequency f of the transmit signal waves $S_{tx}$ is changed from 70 GHz to 90 GHz for every 1 GHz. FIG. 4B is a graph illustrating partially enlarged characteristics at and near the peak values of the characteristic lines in the graph illustrated in FIG. 4A. The horizontal and vertical axes of the graph are the same as those in the graph in FIG. 4A.

Figure 5:
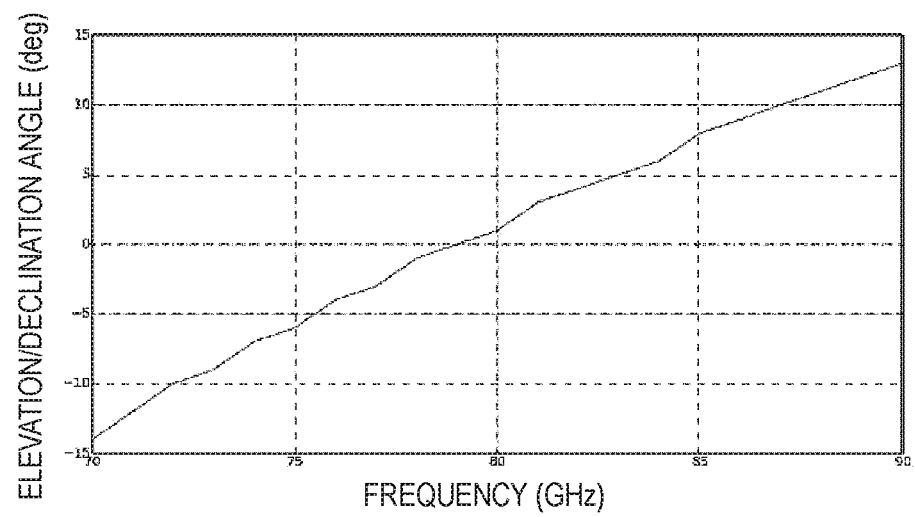
FIG. 5 is a graph illustrating the relationship between the elevation/declination angles at the peak values of the characteristic lines in the graph illustrated in FIGS. 4A and 4B and the frequencies of the characteristic lines corresponding to the elevation/declination angles.

The graph in FIG. 5 illustrates the relationship between the elevation/declination angles φ for the peak values of the characteristic lines in the graph in FIGS. 4A and 4B and the frequencies f of the characteristic lines corresponding to the elevation/declination angles φ. The graph in FIG. 5 is obtained by plotting the elevation/declination angles φ with respect to the transmit frequencies f. The horizontal axis in the graph represents the frequency f (GHz), and the vertical axis represents the elevation/declination angle φ (deg). It is understood that, from the graph and Expression (4), the frequency f of a transmit signal applied to the transmit antenna Tx may be used to make such design that the beams are inclined in the elevation/declination angle direction.

Figure 6:
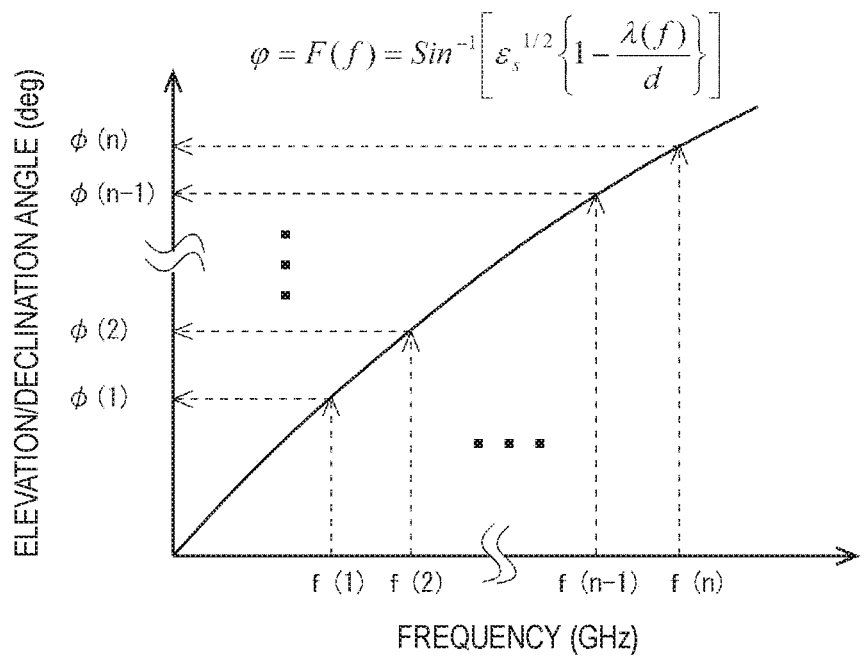
FIG. 6 is a graph illustrating a correlation between transmit signal frequency and elevation/declination angle in a radar apparatus according to an embodiment.

Various methods are known as a method of modulating a transmit signal in a radar apparatus. In the present embodiment, the multilevel FSK method is used to modulate a transmit signal. In the multilevel FSK, as illustrated in the graph in FIG. 6, the frequency f of a transmit signal is changed discretely as in f(1), f(2), . . . , f(n−1), f(n). Thus, the elevation/declination angle φ calculated by using Expression (4) from the frequency f is changed as in φ(1), φ(2), . . . , φ(n−1), φ(n). The horizontal axis of the graph represents the frequency f (Hz) of a transmit signal, and the vertical axis represents the elevation/declination angle φ (deg). The typical FSK uses a method of switching between two values (f1, f2). In the present embodiment, the frequency f switches between multiple values.

Figure 7:
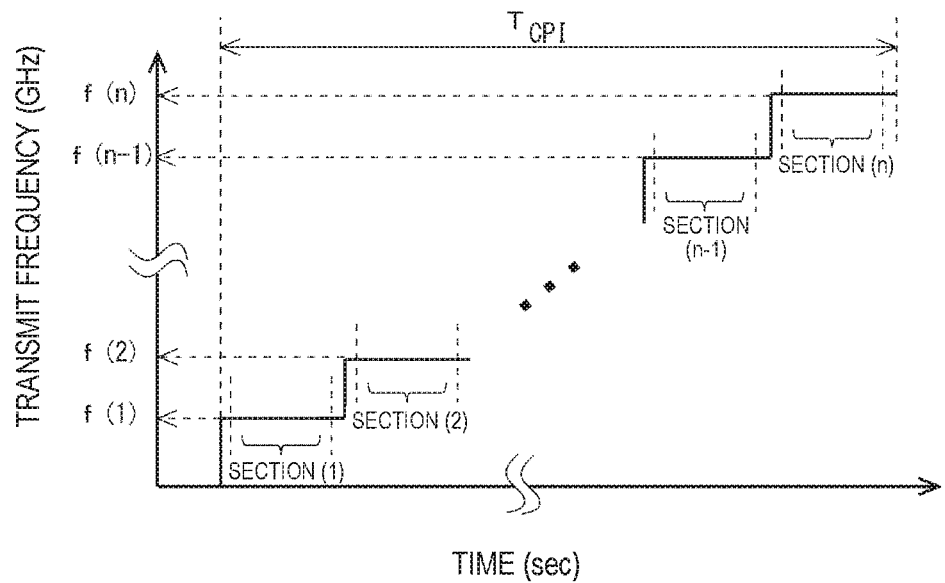
FIG. 7 is a graph illustrating a time-series frequency change in a transmit signal which is obtained when the transmit signal frequency is increased stepwise in a radar apparatus according to an embodiment.

The graph in FIG. 7 illustrates a time-series change in frequency of a transmit signal which is obtained when the frequency f of the transmit signal is increased stepwise n times from f(1) to f(n) in one measurement. The horizontal axis of the graph represents time (sec), and the vertical axis represents the frequency f (Hz) of a transmit signal. Signals are transmitted discretely in the following manner: in section (1), a signal of frequency f(1) is transmitted; in section (2), frequency f(2); in section (n−1), frequency f(n−1); in section (n), frequency f(n). In each section, the computing unit 6 multiplies the transmit signal wave voltage $V_{tx}$, which is indicated by using Expression (5) as described below and which is transmitted from the transmit antenna Tx, by the receive signal wave voltage $V_{rx}$, which is indicated by using Expression (6) described below and which is received by a receive antenna Rx.

In Expressions (5) and (6), $A_{tx}$ represents the amplitude of the transmit signal wave voltage $V_{tx}$, $A_{rx}$ represents the amplitude of the receive signal wave voltage $V_{rx}$, φ1 represents the phase of the transmit signal wave voltage $V_{tx}$, ω1 (=2πf1) represents the angular frequency of the transmit signal wave voltage $V_{tx}$, R represents the distance to the target 7, v represents the relative velocity with respect to the target 7, and c represents the speed of light.

[Math. 5]

$$V_{tx} = A_{tx}\cos(\omega_1 t + \phi_1) \quad (5)$$

$$V_{rx} = A_{rx}\cos\left[\omega_1\left\{t - \frac{2(R-vt)}{c}\right\} + \phi_1\right] \quad (6)$$

Expression (7) described below indicates the multiplied signals $V_{tx} \times V_{rx}$ which are obtained in the following manner: the mixers 4 perform conversion to intermediate frequencies if which are subjected to filtering using a low pass filter (LPF) (not illustrated); then, the computing unit 6 multiplies the transmit signal wave voltage $V_{tx}$ by the receive signal wave voltage $V_{rx}$ in each section. In Expression (7), c represents the speed of light.

[Math. 6]

$$\begin{aligned}
&\text{if (1): } \frac{A_{tx} \cdot A_{rx}}{2}\cos 2\pi\left[\frac{2f_1 v}{c}t - \frac{2R_1 f_1}{c}\right] \\
&\text{if (2): } \frac{A_{tx} \cdot A_{rx}}{2}\cos 2\pi\left[\frac{2f_2 v}{c}t - \frac{2R_1 f_2}{c}\right] \\
&\quad \vdots \\
&\text{if } (n-1): \frac{A_{tx} \cdot A_{rx}}{2}\cos 2\pi\left[\frac{2f_{n-1} v}{c}t - \frac{2R_{n/2} f_{n-1}}{c}\right] \\
&\text{if } (n): \frac{A_{tx} \cdot A_{rx}}{2}\cos 2\pi\left[\frac{2f_n v}{c}t - \frac{2R_{n/2} f_n}{c}\right]
\end{aligned} \quad (7)$$

Expression (7) described above indicates the n sets from the if(1) signal to the if(n) signal in time $T_{CPI}$ (see FIG. 7). The first term indicates the Doppler frequency due to the relative velocity v with respect to the target 7, and the second term indicates the phase due to the distance R. In addition, the first term, (2 $f_i$v/c), in the i-th if(i) signal indicates the frequency $f_{if,i}$ of the if(i) signal, and the second term, ($2R_{i/2}f_i$/c), indicates the phase $\varphi_{if,i}$ of the if(i) signal. By using the set of the if signals and the known frequencies f (f(1), f(2), . . . , f(n−1), f(n)), the relative velocity v with respect to the target 7 may be obtained from the first term by using Expression (8) described below, and the distance R may be obtained from the second term by using Expression (9) described below.

[Math. 7]

$$f_{if,i} = \frac{4\pi f_i v}{c} \quad (8)$$

$$R_{i/2} = \frac{c(\phi_{if,i} - \phi_{if,i-1})}{4\pi(f_i - f_{i-1})} \quad (9)$$

That is, the computing unit 6 obtains a multiplied signal $V_{tx} \times V_{rx}$ between the transmit signal wave voltage $V_{tx}$ and the receive signal wave voltage $V_{rx}$ which are converted into intermediate frequencies if for each of the multiple frequencies f(1), f(2), . . . , f(n−1), f(n) obtained through shift keying. Then, the computing unit 6 calculates the distance R to the target 7 by using Expression (9) from the difference in the phase $\varphi_{if,i}$ between the obtained multiplied signals if(1), if(2), . . . , if(n−1), if(n). In addition, the computing unit 6 calculates the relative velocity v with respect to the target 7 by using Expression (8) from the frequencies $f_{if,i}$ of the obtained multiplied signals if(1), if(2), . . . , if(n−1), if(n).

Figure 8:
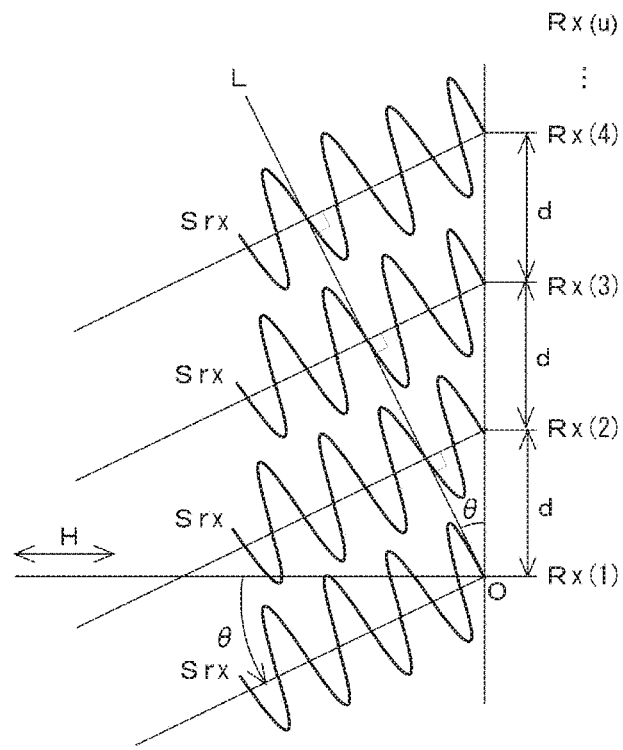
FIG. 8 is a diagram for describing an azimuth angle of receive signal waves received by an array antenna included in a radar apparatus according to an embodiment.

Similarly to the elevation/declination angle φ illustrated in FIG. 3B, FIG. 8 illustrates the azimuth angle θ of the target 7. Each of the receive antennas Rx(1), . . . , Rx(u−1), Rx(u) receives a signal wave $S_{rx}$ of the phase $\xi_u$ expressed by using Expression (10) described below. In expression (10), d represents the distance between the receive antennas Rx(1), . . . , Rx(u−1), Rx(u), and u represents the block number of a corresponding one of the receive antennas Rx(1), . . . , Rx(u−1), Rx(u).

[Math. 8]

$$\xi_u = \frac{2\pi d \cdot (u-1)}{\lambda} \cdot \sin\theta \quad (10)$$

The receive signal waves $S_{rx}$ come in the azimuth angle direction at the angle θ with respect to the horizontal direction H. The phase zero point θ of the receive signal waves $S_{rx}$ is defined at the receive antenna Rx(1). In this case, the straight line L, which connects the phase zero points O of the receive signal waves $S_{rx}$, forms the angle θ with respect to the direction in which the receive antennas Rx(1), . . . , Rx(u−1), Rx(u) are arranged, and intersects at right angles in the direction in which the receive signal waves $S_{rx}$ come. The phase $\xi_u$ is expressed geometrically by using Expression (10) from sine of a right angled triangle whose oblique side has a distance, d·(u−1), among the receive antennas Rx(1), . . . , Rx(u−1), Rx(u). The computing unit 6 calculates the azimuth angle θ of the target 7 by using Expression (11) described below from the difference in the phase $\xi_u$ between the receive signal waves $S_{rx}$ received by the receive antennas Rx(1), . . . , Rx(u−1), Rx(u) included in the array antenna 3. In Expression (11), and represent the phases of the receive signal waves $S_{rx}$ at the receive antennas Rx(i) and Rx(i+1)

[Math. 9]

$$\theta = \mathrm{Sin}^{-1}\left[\frac{\lambda}{2\pi d}(\xi_{i+1} - \xi_i)\right] \quad (11)$$

As illustrated in Expression (4), the FSK frequencies (f(1), f(2), . . . , f(n−1), f(n)) correspond to the elevation/declination angles φ of the transmit signal waves $S_{tx}$. Thus, the elevation/declination angle φ of the target 7 is expressed by using Expression (12) described below, where the transmit frequency of the transmit signal waves $S_{tx}$ which is supplied to the transmit antenna Tx of the block number i is represented by $f_i$.

[Math. 10]

$$\varphi_i = \mathrm{Sin}^{-1}\left[\varepsilon_s^{1/2}\left\{1 - \frac{C}{f_i \cdot d}\right\}\right] \quad (12)$$

That is, the computing unit 6 calculates the elevation/declination angle φ of the target 7 by using Expression (12) from the frequency $f_i$ of the transmit signal waves $S_{tx}$.

Figure 9:
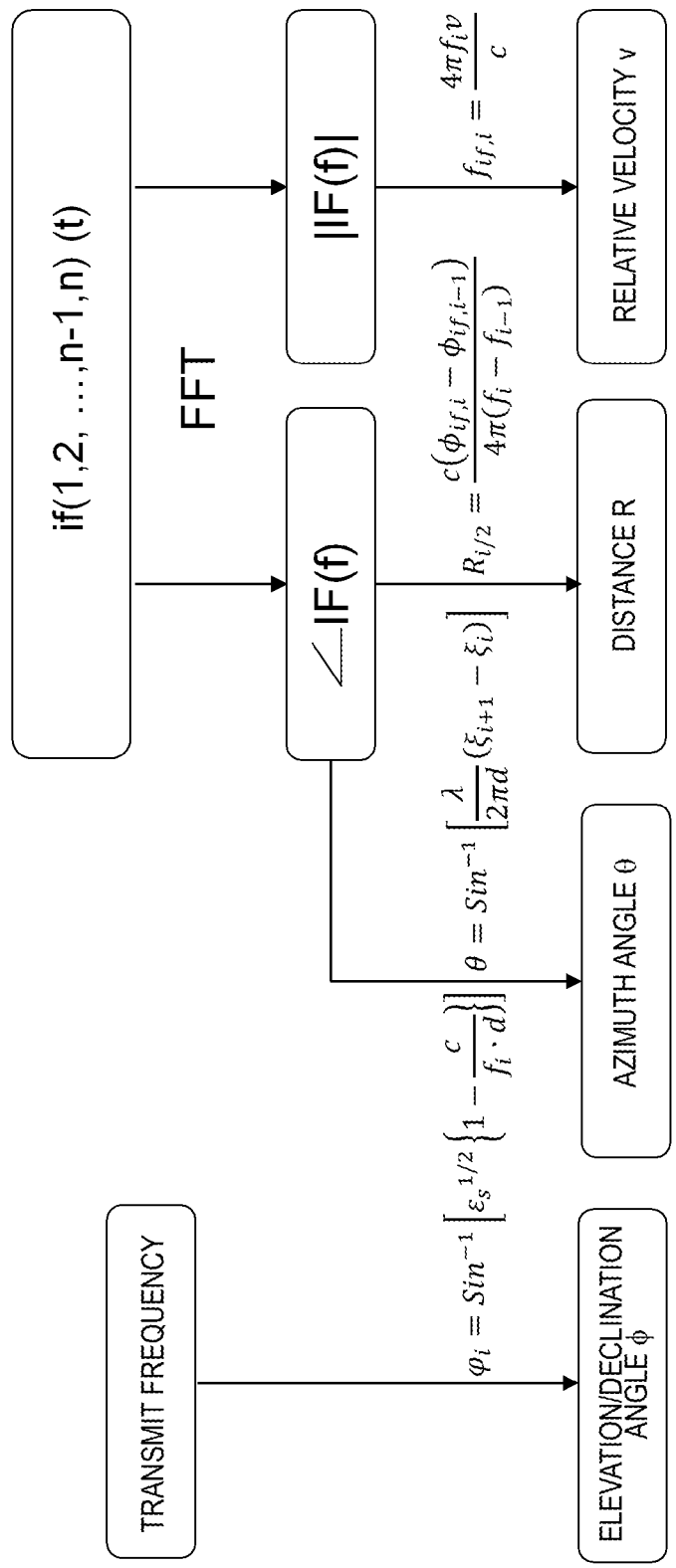
FIG. 9 is a flowchart illustrating the flow for obtaining the elevation/declination angle, the azimuth angle, the distance, and the relative velocity of a target in a radar apparatus according to an embodiment.

FIG. 9 is a flowchart illustrating the flow of obtaining the elevation/declination angle φ, the azimuth angle θ, the distance R, and the relative velocity v of the target 7 described above. The elevation/declination angle φ of the target 7 is obtained by using Expression (12) from the known transmit frequencies $f_i$ of the transmit signal waves $S_{tx}$. The distance R to the target 7 is obtained by using Expression (9) from the phase difference ∠IF(f) between the intermediate frequency signals IF(f) which are obtained as a function of frequency by performing Fourier transform (FFT) on the intermediate signals if(1, 2, . . . , u−1, u) (t) which are functions of time. The azimuth angle θ of the target 7 is obtained by using Expression (11) from the difference in the phase $\xi_n$ between the receive signal waves $S_{rx}$ received by the receive antennas Rx(1), . . . , Rx(u−1), Rx(u). The relative velocity v with respect to the target 7 is obtained by using Expression (8) from the peak value |IF(f)| of the intermediate frequency signal IF(f).

In the radar apparatus 1 according to the present embodiment, the transmit signal waves $S_{tx}$ modulated by using the multilevel FSK are transmitted from the transmit antenna Tx, and reflected waves, which are obtained by reflecting, off the target 7, the transmit signal waves $S_{tx}$ which return, are received by the receive antennas Rx(1), . . . , Rx(u−1), Rx(u) as the receive signal waves $S_{rx}$. Thus, the multilevel FSK is used as a modulation method so that the beat frequency between the receive signal waves $S_{rx}$ from the target 7 and the transmit signal waves $S_{tx}$ serves as the Doppler frequency of the target 7. Thus, the elevation/declination angle φ of the target 7 is calculated, not from the frequencies of receive signal waves as in the related art, but by the computing unit 6 from the frequencies $f_i$ of the transmit signal waves $S_{tx}$ as described above.

The transmit signal waves $S_{tx}$, which are subjected to shift keying to multiple frequencies f(1), . . . , f(2), f(n−1), f(n), are transmitted from the array antenna 3, and the elevation/declination angle φ of the target 7 is calculated on the basis of the known multiple transmit frequencies f(1), f(2), . . . , f(n−1), f(n). Therefore, even in the case of a short distance R to the target 7, a detection circuit and an AD conversion circuit having high time resolution of nanosecond order are not used. Instead, the elevation/declination angle φ of the target 7 may be measured with high accuracy by using a simple circuit at low cost. For example, when the target 7 travels at a speed of 10 m/sec, the Doppler frequency of the target 7 is 1.6 KHz for a transmit frequency of 24 GHz. Therefore, by using calculation results from the low-speed ADCs 5, the computing unit 6 is capable of obtaining easily the elevation/declination angle φ of the target 7, as well as the azimuth angle θ, the distance R, and the relative velocity v.

The frequency of a signal applied to the transmit antenna Tx is used to limit the elevation/declination angle φ of the transmit beam to any range. Thus, influence from clutter from the ground or the like may be suppressed. Compared with a FMCW (Frequency Modulated Continuous Wave) radar using continuous waves subjected to frequency modulation, the radar apparatus 1 according to the present embodiment may detect the target 7 with high resolution since a signal is transmitted with discrete frequencies obtained through multilevel FSK modulation.

In the radar apparatus 1 according to the present embodiment, a multiplied signal $V_{tx} \times V_{rx}$ between the transmit signal wave voltage $V_{tx}$ and the receive signal wave voltage $V_{rx}$ which are converted into intermediate frequencies is obtained for each of the multiple frequencies f with which shift keying is performed. Thus, in addition to the elevation/declination angle φ of the target 7, the distance R to the target 7 and the relative velocity v with respect to the target 7 may be measured with high accuracy by using a simple circuit at low cost.

The azimuth angle θ of the target 7 may be calculated with high accuracy also by using the monopulse phase system, the beam former, the Capon method, MUSIC, or the like. However, the radar apparatus 1 according to the present embodiment calculates the azimuth angle θ of the target 7 from the difference in the phase $\xi_u$ between the receive signal waves $S_{rx}$, enabling the azimuth angle θ of the target 7 to be calculated with a simple algorithm without necessarily an increase in the circuit size, simply and at low cost.

In the radar apparatus 1 according to the present embodiment, the frequency f of a transmit signal applied to the array antenna 3 formed on an identical plane is made variable, enabling the transmit signal to be transmitted with the beam inclined in the elevation/declination angle direction. Therefore, without necessarily an additional phase shifter or the like which is a unit different from the array antenna 3 and which is used to incline the beam in the elevation/declination angle direction as in the radar apparatus described in Patent Document 1, the array antenna 3 formed on an identical plane may be used to incline the beam in the elevation/declination angle direction.

In the radar apparatus 1 according to the present embodiment, the elevation/declination angle φ of the target 7 may be detected from the frequency $f_i$ of the transmit signal waves $S_{tx}$ transmitted from the array antenna 3 formed on an identical plane. Therefore, it is not necessary to provide receive antennas Rx3 and Rx4 disposed in the vertical direction in order to detect the elevation/declination angle φ of the target 7 as in the radar apparatus described in Patent Document 2, achieving a reduction in size of the array antenna 3. Accordingly, the following disadvantage does not occur: in order that the footprint for the antenna remains the same, the antenna area for detecting the azimuth angle θ in the horizontal direction is reduced and the antenna area for detecting the elevation/declination angle φ is allocated; thus, degradation of angle resolution in the horizontal direction, which corresponds to the decreased antennas for the horizontal direction, occurs. In addition, the following disadvantage does not occur: the antenna area for detecting the elevation/declination angle φ is newly added; receive systems, such as a low-noise amplifier (LNA), a multiplier (MIXER), an intermediate frequency amplifier (IFAMP), and a filter, are also added for the additional antennas; thus, the occupation area of the apparatus is increased, resulting in inhibition against reduction in size and reduction in power consumption of the radar apparatus 1.

According to the present embodiment, the case in which the unit antenna 3(i) in the array antenna 3 includes the four patch antenna devices p1, p2, p3, and p4 is described. However, the number of patch antenna devices included in the unit antenna 3(i) may be increased. In this case, the beam width of the transmit signal waves $S_{tx}$ is made narrow, resulting in an increase in the detection resolution of the target 7. In addition, according to the present embodiment, the case in which the array antenna 3 includes the patch antenna devices p1, p2, p3, and p4 is described. However, horn antennas or the like may be arranged in an array. These configurations also exert effects similar to those of the radar apparatus 1 according to the present embodiment.

INDUSTRIAL APPLICABILITY

The radar apparatus 1 of the present disclosure is desirably used as a car-mounted radar or the like which detects a target at a relatively short distance.

Figure 10:
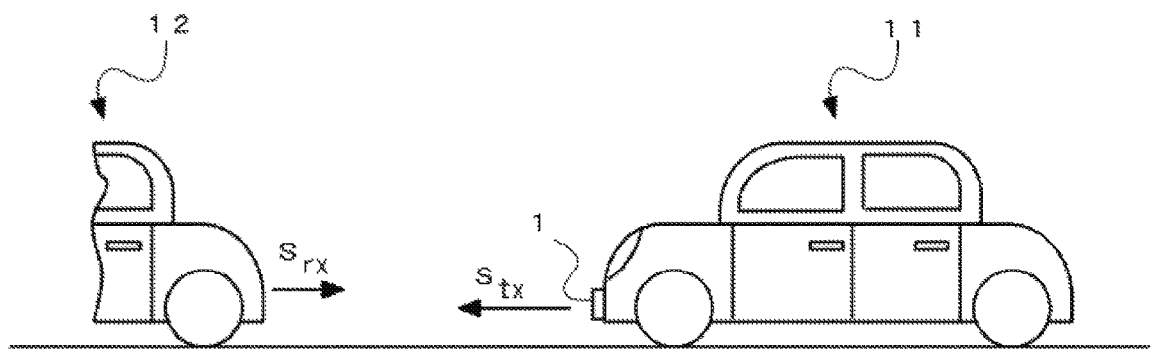
FIG. 10 is a side view of an automobile including a radar apparatus according to an embodiment.

FIG. 10 is a side view of an automobile 11 including the above-described radar apparatus 1 as a car-mounted radar. The radar apparatus 1 is attached, for example, on the front of the vehicle body of the automobile 11, and transmits the transmit signal waves $S_{tx}$ from the transmit antenna Tx forward in the traveling direction of the automobile 11. The receive antennas Rx receive, as the receive signal waves $S_{rx}$, reflected waves obtained by reflecting, off a target, for example, an automobile 12 which travels in front, the transmit signal waves $S_{tx}$ which are transmitted from the transmit antenna Tx and which return. The computing unit 6 calculates the elevation/declination angle of the target, the azimuth angle of the target, the distance to the target, and the relative velocity with respect to the target on the basis of the transmit signal waves $S_{tx}$ and the receive signal waves $S_{rx}$.

Figure 11:
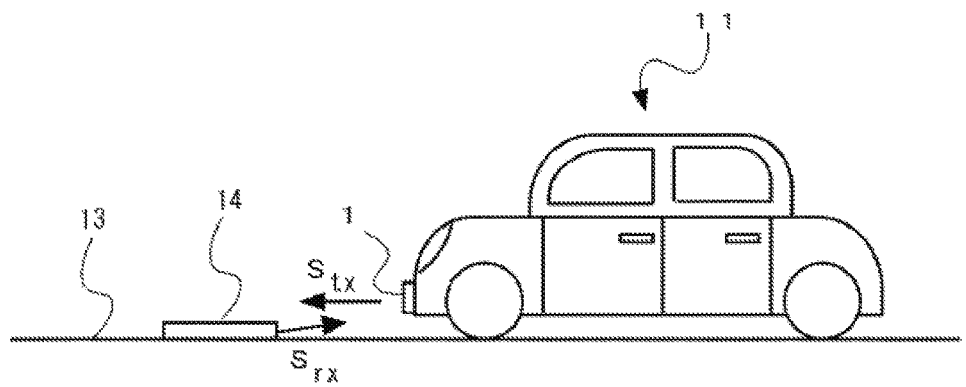
FIG. 11 is a side view of an automobile which is in a different situation and which includes a radar apparatus according to an embodiment.

FIG. 11 is a side view of the automobile 11 which is in a different condition and which includes the above-described radar apparatus 1 as a car-mounted radar. In this condition, a manhole cover 14 protrudes abnormally on a road surface 13. The transmit signal waves $S_{tx}$ transmitted from the radar apparatus 1 forward in the traveling direction of the automobile 11 are reflected off the manhole cover 14, and the receive antennas Rx receive the reflected waves as the receive signal waves $S_{rx}$. The computing unit 6 calculates the elevation/declination angle and the like by using the manhole cover 14 as a target, on the basis of the transmit signal waves $S_{tx}$ and the receive signal waves $S_{rx}$.

Even in the case of a short distance to a target, the configuration may also provide the automobile 11 including the radar apparatus 1 which is capable of measuring the elevation/declination angle and the like of the target with high accuracy by using a simple circuit at low cost without necessarily use of a detection circuit and an AD conversion circuit having high time resolution. Therefore, for example, the automobile 12 traveling immediately in front of the automobile 11, or the manhole cover 14 protruding abnormally on the road surface 13 in a front area of the automobile 11 may be detected swiftly, enabling danger to be avoided in advance.

REFERENCE SIGNS LIST 1 radar apparatus
2 RF signal generator
3 array antenna
Tx transmit antenna
Rx(1), . . . , Rx(u−1), Rx(u) receive antenna
3(i) unit antenna
p1, p2, p3, p4 patch antenna device
4 mixer
5 ADC
6 computing unit
7 target
11, 12 automobile
13 road surface
14 manhole cover

The invention claimed is:

1. A radar apparatus comprising:
a signal generator configured to generate a transmit signal subjected to shift keying to multiple frequencies;
an array antenna configured to transmit signal waves, and to receive signal waves, wherein a beam of each of the transmit signal waves is inclined by an elevation/declination angle corresponding to one of the shift keyed frequencies of the transmit signal, and each of the receive signal waves is a reflection of a corresponding one of the transmit signal waves off a target;
a mixer configured to convert frequencies of the transmit signal waves and the receive signal waves into intermediate frequencies; and
a processor configured to:
compute an elevation/declination angle of the target from the frequencies of the transmit signal waves,
generating a plurality of multiplied signals by multiplying a voltage of each converted transmit signal wave with a voltage of a corresponding converted receive signal wave,
calculate a distance to the target based on a phase difference between the multiplied signals, and
calculate a relative velocity with respect to the target based on frequencies of the multiplied signals,
wherein:
each antenna of the array antenna is in a same plane,
the array antenna comprises an antenna power supply point and a plurality of patch antenna devices connected to the antenna power supply point, the plurality of patch antenna devices being arranged linearly in a first direction, and each of the plurality of patch antenna devices has a different phase.

2. The radar apparatus according to claim 1, wherein the processor is further configured to calculate an azimuth angle of the target based on a phase difference between the receive signal waves.

3. An automobile comprising the radar apparatus according to claim 1.

4. An automobile comprising the radar apparatus according to claim 2.

5. The radar apparatus according to claim 1, wherein each of the plurality of patch antenna devices is spaced apart at an interval d, and a phase $\eta_1$ of a signal wave transmitted from a corresponding one of the plurality of patch antenna devices is:

$$\eta_1 = \frac{2\pi d(m-1)}{\lambda(f)} - 2\pi(m-1) = \frac{2\pi(m-1)(d-\lambda(f))}{\lambda(f)}$$

where $\lambda(f)$ is a wavelength of the signal wave in a substrate at a frequency f, and m is a number of the plurality of patch antenna devices.

* * * * *

UNITED STATES PATENT AND TRADEMARK OFFICE
CERTIFICATE OF CORRECTION

PATENT NO. : 11,231,483 B2
APPLICATION NO. : 16/808640
DATED : January 25, 2022
INVENTOR(S) : Katsuhisa Kashiwagi et al.

It is certified that error appears in the above-identified patent and that said Letters Patent is hereby corrected as shown below:

In the Specification

Column 7, Line 40, "$\varphi 1$" should be -- $\omega 1$ --.

Column 8, Line 67, "$\theta$" should be -- O --.

Column 9, Line 8, "sine" should be -- $\sin\theta$ --.

Signed and Sealed this
Eighth Day of November, 2022

Katherine Kelly Vidal
*Director of the United States Patent and Trademark Office*